J. E. WILCOXEN.
ART OF CONSTRUCTING AXLE SKEINS FOR VEHICLES.
APPLICATION FILED JUNE 22, 1908.
933,806.
Patented Sept. 14, 1909.
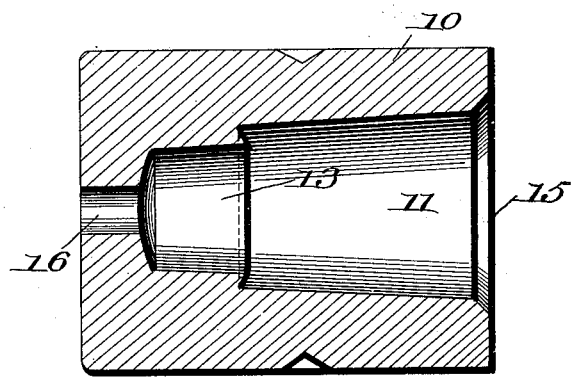
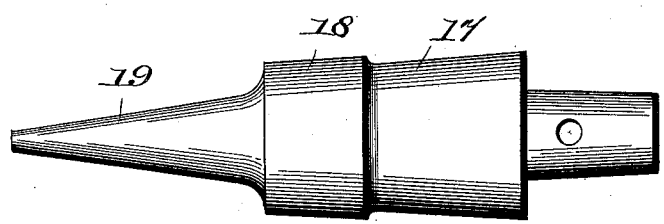
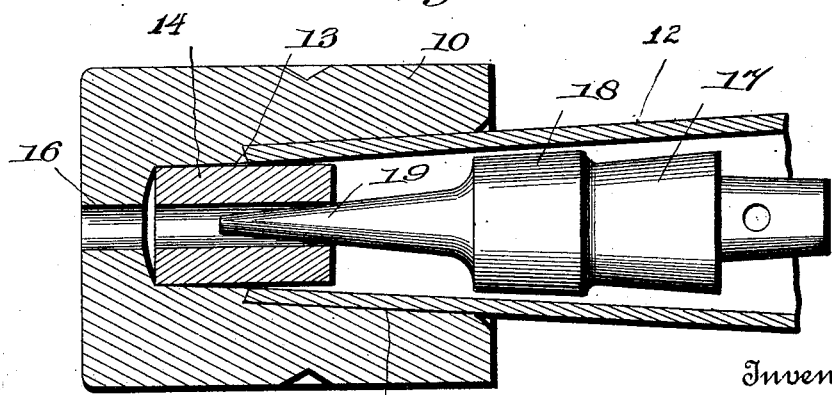

UNITED STATES PATENT OFFICE.

JOHN EDWIN WILCOXEN, OF SOUTH BEND, INDIANA.

ART OF CONSTRUCTING AXLE-SKEINS FOR VEHICLES.

933,806.

Specification of Letters Patent.   Patented Sept. 14, 1909.

Application filed June 22, 1908.   Serial No. 439,826.

*To all whom it may concern:*

Be it known that I, JOHN EDWIN WILCOXEN, a citizen of the United States, residing at South Bend, in the county of St. Joseph and State of Indiana, have invented certain new and useful Improvements in the Art of Constructing Axle-Skeins for Vehicles, of which the following is a specification.

This invention relates to certain new and useful improvements in the art of constructing axle skeins for vehicles.

Heretofore it has been common practice to bend up a flat metal and weld the same along the meeting edges to form the body of the skein. To hold the nut on the end of the axle, a plug of proper shape, is mounted in the end of said body and welded in place, after which the same is threaded in any preferred manner. In this welding step, it frequently happens that an imperfect union is secured, and a rough and unfinished end is produced which has to be turned up on a lathe before it can be threaded.

The present invention has for its object to overcome these defects by an improved manner of uniting the plug to the skein body, whereby a finished axle skein is produced with minimum labor.

The invention will be hereinafter fully set forth and particularly pointed out in the claim.

In the accompanying drawings—Figure 1 is a sectional view of a die adapted to unite an axle skein and plug. Fig. 2 is a side view illustrating the mandrel. Fig. 3 is a sectional view with the parts assembled.

Like characters of reference designate corresponding parts.

Referring to the accompanying drawings, 10 designates the die provided with a chamber 11 to receive the body of the skein 12, and a reduced portion 13 to receive the plug 14. Said die is open at one end as indicated at 15 and provided with a vent opening 16 leading from the plug chamber 13. The mandrel is formed with a body 17 provided with a tapered portion 18 adapted to fit within the skein body, and leading therefrom is an attenuated reduced shank 19.

In practice the plug and the end of the skein are brought to a welding heat, and the skein is dropped into the mandrel, after which the plug is dropped inside the skein. The mandrel is then inserted and the parts forced into a weld. This may be done by attaching the die and mandrel to a "bull-dozer" or the die may be secured to the anvil of a drop hammer, and the mandrel to the drop and the weld would thus be produced by a stroke instead of pressure. The surplus metal is discharged through vent 16.

From the foregoing description it will be seen that the mandrel forces the metal of the plug diametrically outward and also in a longitudinal direction, bringing the parts into welding contact, thereby forming a perfect internal weld. The die will also give a smooth and exact exterior finish to the skein and plug, and the latter may be at once threaded without any preliminary tool finishing.

I claim as my invention:—

The method of forming axle skeins, consisting in inserting a portion of a tubular plug in and beyond one end of a tapered tubular skein, holding said skein against endwise and outward displacement, holding the plug against endwise displacement, providing a vent in communication with the end of the plug and forcing the metal of the inserted portion of the plug while at a welding heat diametrically and longitudinally by pressure within the plug, thereby forming an internal weld, and simultaneously disposing of the surplus metal resulting from said weld through the open end of the plug and outward through its holding means and through said vent.

In testimony whereof I have affixed my signature, in presence of two witnesses.

JOHN EDWIN WILCOXEN.

Witnesses:
S. E. BABCOCK.
E. H. LYNCH.